2,855,279
Patented Oct. 7, 1958

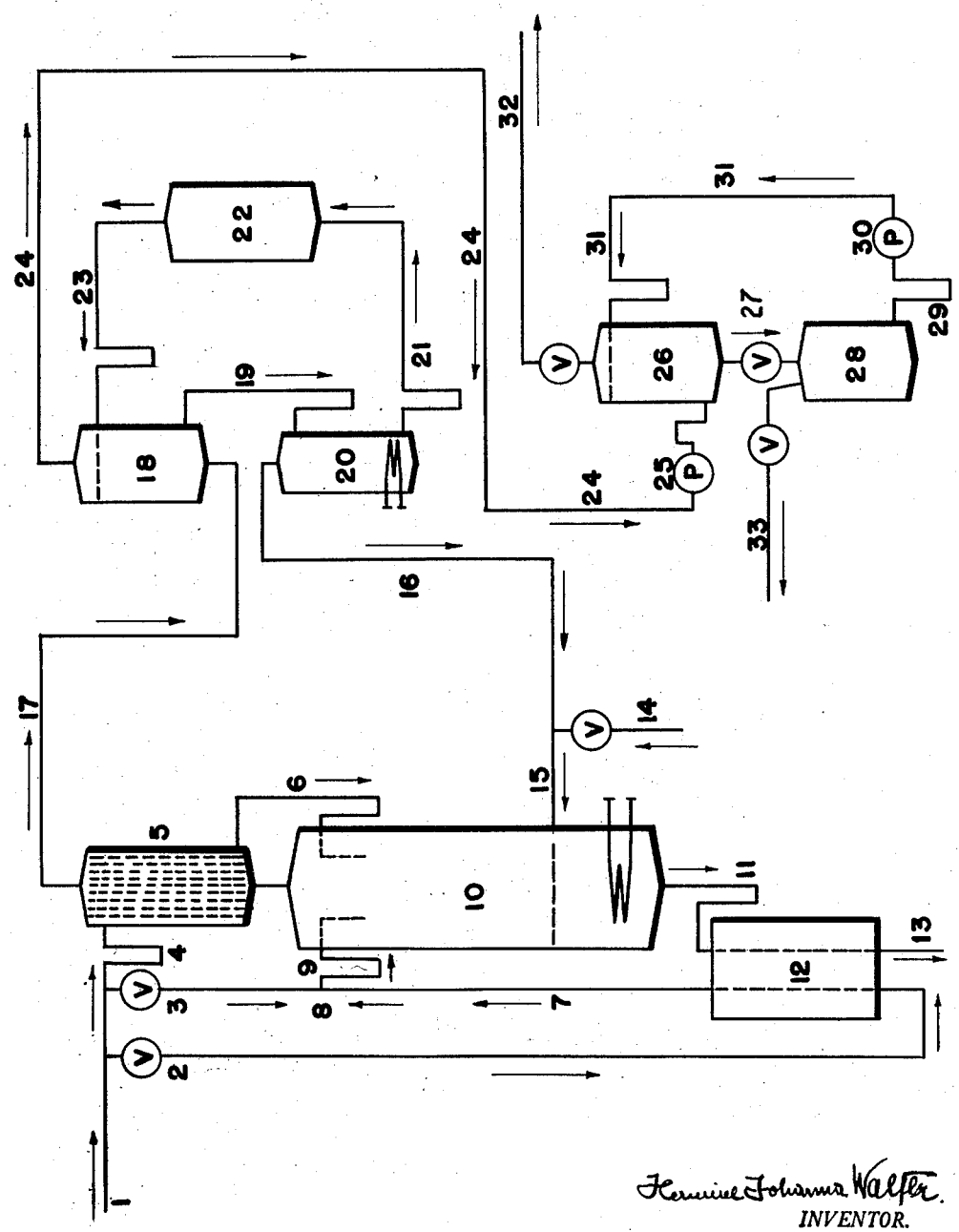

2,855,279

PROCESS FOR CONVERTING HYDROCHLORIC ACID INTO CHLORINE

Hermine Johanna Walter, Huntsville, Ala.

Application March 29, 1956, Serial No. 574,914

3 Claims. (Cl. 23—219)

This application is a continuation-in-part of my copending application Serial No. 389,894, filed November 2, 1953 (now abandoned) and relates to a process for converting hydrochloric acid into elemental chlorine by oxidizing said hydrochloric acid in aqueous solution with excessive quantities of oxygen or air in the presence of nitrogen dioxide or nitric acid, whereby the temperature of the reaction batch is kept between 50° C. and 100° C. or higher, however such, that the reaction mixture is substantially maintained in the liquid state. The gaseous mixture of chlorine together with oxides of nitrogen and inert gases are subsequently scrubbed with sulfuric acid of concentrations between 60% and 98%, whereupon pure chlorine is recovered by extraction with carbon tetrachloride under pressure. Extremely high yields and throughput may be obtained by decreasing the stay time inside the reactor to such an extent as to obtain an exhausted hydrochloric acid of about 3% to 10% and subsequently passing this diluted hydrochloric acid to any point for re-loading with hydrogen chloride, as occuring in chlorination, whereby the enriched aqueous hydrochloric acid is recycled to the converter.

The recovery of chlorine from hydrochloric acid is of special importance for processing hydrogen chloride, occuring in large quantities in all chlorination processes. Most suggestions for recovery of chlorine from hydrochloric acid are based on the Deacon principle. It was likewise suggested to perform said recovery by oxidizing hydrogen chloride by means of nitric acid. All these processes have common that dehydrated gaseous hydrogen chloride can be processed exclusively. But since hydrogen chloride can practically be stored, shipped or otherwise transported in aqueous solutions only, all hitherto known processes had to provide previous re-dehydration of hydrochloric acid, previous to oxidation.

My present invention avoids said disadvantages, since it is based on an immediate processing of aqueous hydrochloric acid of any concentration. My new process consists essentially in oxidizing said liquid aqueous solution of hydrochloric acid with oxygen or air in the presence of nitrogen dioxide, nitric acid, nitrosyl chloride or nitric oxide at temperatures of at least 50° C. Nitrogen dioxide will in general constitute the main oxidation catalyst, since nitric acid reacts largely with hydrochloric acid according to the aqua regis-reaction:

$$2HNO_3 + 6HCl = 4H_2O + 2Cl_2 + 2NOCl$$

However nitrosyl chloride, the decomposition of which was a serious problem in known processes, is readily decomposed in consequence of the presence of liquid water especially at elevated temperatures. This hydrolysis, which is enhanced by the large excess of water, runs as follows:

$$2NOCl + H_2O = 2HCl + NO_2 + NO$$

Nitric oxide is immediately oxidized by present air or oxygen to nitrogen dioxide according to:

$$2NO + O_2 = 2NO_2$$

The latter oxidizes hydrochloric acid according to the following equation, which is prevailing in my process:

$$2NO_2 + 4HCl = 2Cl_2 + 2H_2O + 2NO$$

Nitric oxide however is immediately oxidized to nitrogen dioxide, as shown previously. An important feature of the new process is to provide, that the reaction is run at elevated temperatures. In general temperatures between 50° C. and 110° C. are appropriate. Experiments showed that the reaction rate and throughput are greatly increased by increased temperatures. Preferred temperatures for the process are between 80° C. and 100° C. On the other hand it is not advisable to run the reaction too close to the boiling point on reason of preventing undue evaporation and heat losses, that can no longer be compensated by heat exchangers. Of course it is possible to provide temperatures higher than 110° C., if the reaction is performed under increased pressure.

It is noteworthy to state that the above described reactions could not be foreseen. Thermodynamical calculations showed that the above equations run endothermic, on reason of the caloric data given in literature. This however holds for low temperatures only. At elevated temperatures it was surprisingly found, that the above simultaneous reactions are running exothermic. This is presumedly due to the fact, that the fugacity of hydrogen chloride is greatly increased with increasing temperatures.

Comparative tests showed furthermore, that reaction rate and throughput can be considerably improved by providing reactors with packing material. Any material, sufficiently resistant against the attack of hot muriatic acid, may be used. However I give the preference to coke, graphite, both in lumps or any other form like Raschig rings, pebbles or Berl saddles. Phenoplasts, chlorinated rubber, hardened rubber, poly vinyl chloride or Teflon are likewise useful. Same material proved successful for lining the reactor walls. Said packing material does not only provide increased surface but likewise stimulates the equilibrium between the liquid and the gaseous constituents inside the reactor, in a manner specific for the new process.

The gases issuing from the reactor consist of chlorine, nitrogen dioxide, excessive oxygen and possibly atmospheric nitrogen, carrying along some moisture. These gases are then scrubbed with sulfuric acid, containing 70% to 98% of $H_2SO_4$. By this way nitrogen dioxide as well as moisture are absorbed. It is known that concentrated sulfuric acid absorbs nitrogen dioxide, and it is furthermore well known that concentrated sulfuric acid also absorbs water vapor. However it is likewise known, that nitrogen dioxide, absorbed in concentrated sulfuric acid with the formation of nitrosyl sulfuric acid, is liberated again by the addition of water. It was therefore surprising, that sulfuric acid according to the present invention, is capable to absorb simultaneously both, water and nitrogen dioxide, as occuring in the the new process. Consequently the sulfuric acid scrubber can be operated with sulfuric acid of e. g. 80% to 70% and even as low as 60%.

The sulfuric acid loaded with nitrogen dioxide and water is subsequently heated up in order to expel nitrogen dioxide and water, whereby the sulfuric acid is re-concentrated up to some concentration between said 60% and 98%. Nitrogen dioxide and water vapor thus recovered are recycled back to the reactor.

The gases leaving the sulfuric acid scrubber consist of chlorine, any excessive ogygen and possibly atmospheric nitrogen. In order to recover chlorine therefrom, the gases are scrubbed with carbon tetrachloride under pressure. This scrubbing process may be assisted by cooling down said carbon tetrachloride. However it is practical to work at ambient temperatures without cooling, since complete absorption can be achieved by increased pressure alone, whereby gauge pressures between 40 and 500 lb./sq. inch are sufficient. The not dissolved gaseous constituents, consisting of oxygen and possibly nitrogen are vented. Following this step the solution of chlorine in carbon tetrachloride is pressure released, whereby chlorine is recovered in gaseous form. In this step it is advisable to release or lower the pressure to a gauge pressure less than 40 lb./sq. inch, preferably between 10 lb./sq. inch and 30 lb./sq. inch. Complete pressure release to normal pressure might result in remarkable losses of carbon tetrachloride, carried along by gaseous chlorine liberated. When the pressure is released to between 10 and 30 lb./sq. inch, losses of entrained carbon tetrachloride are vanishingly low in consequence of the decreased specific volume of chlorine liberated.

In performing my process, an aqueous solution of hydrochloric acid of any concentration between 10% and 35% contents of hydrogen chloride may be used. This may be performed in an apparatus, shown in the annexed drawing. Referring to this, said aqueous liquid hydrochloric acid is fed in by line 1 into reactor 10. Instead of one reactor 10 two equal reactors may be installed in series, one above the other. Part of the liquid feed is passed via necked trap 4 through the heat exchanger 5 and entering 10 via necked trap 6. Another part of the hydrochloric acid feed is passed via valve and line 3 and then through junction point 8 and necked trap 9 into reactor 10. A third part of the hydrochloric acid feed is passed via valve and line 2 through heat exchanger 12 and thence via line 7 to junction point 8, necked trap 9 and finally into reactor 10. Heat exchanger 5 is heated up by the vapors, carried along with the gaseous constituents, which are issuing from top of reactor 10. Heat exchanger 12 is heated up by the hot exhausted liquid hydrochloric acid, which issues from the bottom of reactor 10 through necked trap 11, heat exchanger 12 and outlet 13. Reactor 10 is heated up with steam by means of a tantalum coil, mounted near the exit point at the bottom of reactor 10. Tantalum tubings may likewise be installed in heat exchangers 5 and 12, as feed pipes at 9 and 6 as well as at position 15. Graphite, coke or any kind of carbon, molded by means of phenoplasts are likewise feasible material for said heat exchangers and pipings. Heat may likewise be supplied to reactor 10 by means of electrically heated rods of graphite or coke.

A small part of the exhausted liquid, flowing out of 13, may be recycled to points 9 or 6, in order to provide a zone of dilution of hydrochloric acid at the top of the reactor 10 in order to complete hydrolysis of any entrained nitrosyl chloride. However it was found, that, when maintaining reactor 10 at the prescribed temperatures, no more nitrosyl chloride could be detected in the gases, leaving reactor 10. The gaseous mixture issuing from the top of reactor 10 passes through heat exchanger 5, that acts likewise as a reflux condenser. From the top of 5 the gaseous mixture passes through pipe 17 to scrubber 18. Here nitrogen dioxide and possibly some nitric acid are absorbed along with moisture by sulfuric acid. Said sulfuric acid, loaded with nitrogen dioxide, possibly nitric acid and moisture are passed through necked trap 19 to regenerator 20. Here the loaded sulfuric acid is heated by a steam coil, whereby nitrogen dioxide, possibly nitric acid and water are removed and fed back through lines 16 and 15 into reactor 10, by means of a perforated coil, located inside of 10. At any point before the entrance of 15 into reactor 10, air or oxygen are admixed via inlet at needle valve 14. Regenerated sulfuric acid from vessel 20 is passed through necked trap 21, condenser 22 and necked trap 23 into scrubber 18, where regenerated sulfuric acid, fed in by means of a perforated coil inside 18. Scrubber 18 is provided with packing material of any vitreous or graphite containing packing material, similarly as reactor 10.

The gaseous mixture issuing from top of scrubber 18 consists of chlorine and possibly oxygen and nitrogen. These gases are passed through line 24 to pump 25, where they are compressed to any pressure as stated above. Subsequently they are forced into scrubber 26, which is supplied with carbon tetrachloride, that extracts chlorine. Any nitrogen or oxygen, which are insoluble in carbon tetrachloride, are passed through needle valve 32 and thence vented. Carbon tetrachloride, loaded with chlorine is passed through needle valve 27, whereby the pressure is released to between 10 and 30 lb./sq. inch gauge pressure in vessel 28. Chlorine, thus liberated, is drawn off on top of vessel 28 and passed through needle valve and line 33 to chlorine storage. Exhausted carbon tetrachloride, however still containing small amounts of chlorine, is drawn off at the bottom of vessel 28 through necked trap 29 to pump 30. Here carbon tetrachloride is re-compressed to a pressure of between 40 and 500 lb./sq. inch and forced through line 31 into scrubber 26 for re-loading.

Starting and operating the new process is performed as follows: Reactor 10 is filled with aqueous hydrochloric acid, and heat is supplied, until the temperature inside the reactor 10 has reached about 100° C. Then air or oxygen is fed into reactor 10 via 14 and 15, and in addition to this, nitric acid, amounting to 3%–5% of the total amount of hydrogen chloride in reactor 10, is likewise fed in via 14 and 15. The reaction starts almost immediately. Since the reaction is exothermic, heat supply has now to be reduced, so as to maintain said 100° C. Now further aqueous hydrochloric acid is fed in by line 1, and the further distribution of the liquid feed is distributed through the three feed lines 2, 3 and 4 in such a manner, that minimum quantities of moisture are carried away through line 17 and outflowing exhausted aqueous hydrochloric acid shows temperatures of 50° C. and less.

The gaseous mixture issuing from the top of heat exchanger 5 is passed through a sulfuric acid scrubber and then to the carbon tetrachloride scrubber. Regeneration of loaded sulfuric acid from 18 as well as chlorine-loaded carbon tetrachloride from scrubber 26 may be performed continuously or batchwise, whilst operation of reactor 10 is performed in a continuous manner. When the apparatus has been started, further addition of nitric acid is in general no longer necessary, since from now on reactor is supplied with nitrogen dioxide and possibly some nitric acid from regenerator 20. From time to time a little bit nitric acid will be admitted through 14 for the purpose only, to even up inevitable losses of nitric values.

In the event oxygen is supplied through lines 14 and 15 the carbon tetrachloride scrubber assembly might be replaced by a conventional compressor and cooling-unit, whereby liquefied chlorine is collected immediately. In this event however the chlorine produced contains remarkable quantities of oxygen, which are undesirable. For it prevents very often starting and operating chlorination processes by interrupting the valuable reaction chains. In addition to this said compressor and cooling-principle is always burdened with the occurrence of appreciable quantities of so called Sniff Gas, that means a substantially non-condensable gaseous mixture of oxygen and chlorine of about 1:1. If however the apparatus is operated with the by far cheaper air, then the co-operation of carbon tetrachloride assembly 26 is advisable. In addition to this chlorine is obtained in a substantially oxygen-free form, which involves considerable advantage in all chlorination processes.

An apparatus, quite similar to the above described, with a reactor of 6.1 feet hight and 6 inches inner diameter was used for the following run: An aqueous hydrochloric acid of 20% hydrogen chloride was passed through said reactor together with 800 cu. yd. (standard conditions) of air, mixed with 50 grams of nitrogen dioxide in countercurrent flow. The temperature inside the reactor was maintained at 90–92° C. The stay-time inside the reactor amounted to about 40 minutes. When the apparatus had reached steady equilibrium, the exhausted acid, drawn off from point 13 (see annexed drawing), contained 2.2% hydrogen chloride, whilst 17.8% hydrogen chloride were completely converted to chlorine. In this run a space-time efficiency of 427 lbs. chlorine/ hour/cu. yd. was reached.

As mentioned above the new process is of special value in combination with chlorination processes in general. In these chlorination processes tremendous quantities of hydrogen chloride are occurring as a most undesired byproduct, since there is little demand for hydrochloric acid, and that only for chemically pure one. As a rule however hydrochloric acid occurring in chlorination processes is always contaminated and very hard to purify. Consequently most chlorination processes cannot be carried out commercially, unless hydrochloric acid occuring is recovered to elemental chlorine. To this end hydrogen chloride occurring in chlorination plants must be absorbed in water and in this form shipped or piped to the chlorine recuperation plant. But since the known processes concern only processing of substantially waterfree hydrogen chloride, said shipped aqueous hydrochloric acid must be processed again to waterfree hydrogen chloride, previous to further processing to chlorine.

Due to the fact that the new process is basic in immediate processing of liquid aqueous hydrochloric acid of any concentration, this process enables to run the recuperation of chlorine in an utmost cheap and profitable manner. To this end hydrogen chloride, occurring in the several chlorination plants of a factory, is absorbed in water and shipped or piped to the chlorine recuperation unit. Here said aqueous hydrochloric acid is converted to chlorine according to the new process. In this event however it is advisable to increase the throughput through the reactor, as to obtain an outflowing aqueous hydrochloric acid, still containing remarkable amounts of hydrogen chloride, of 10% HCl and less. In general concentrations of 2 to 5% of hydrogen chloride are advisable. Under these circumstances the space-time efficiency of the reactor (position 10 of annexed drawing) can be improved to twice its normal value and more. The exhausted, say 4% hydrogen chloride containing outflow may be passed through a graduation equipment, following outflow position No. 13, in order to cool down completely to ambient temperatures and to get rid of that part of water, which is produced in consequence of the oxidation of hydrochloric acid. Then the diluted aqueous hydrochloric acid is sent to said chlorination plants for re-loading with hydrogen chloride, followed by re-cycling again the more concentrated hydrochloric acid to the chlorine recuperation plant. By this way quantitative yields of chlorine recovered are obtained with very high throughputs, simultaneously preventing any sewage problem.

What I claim is:

1. A process for converting hydrochloric acid into chlorine comprised of the following steps: passing an aqueous hydrochloric acid solution of concentration not to exceed 35% in countercurrent flow with a gaseous mixture of air and $NO_2$ at temperatures between 80° C. and the boiling point of said hydrochloric acid solution through a reactor provided with packing material, scrubbing the effluent gases from said reactor with sulfuric acid having a concentration of 60%–98% to absorb $NO_2$ and moisture from the said effluent gases, further scrubbing the unabsorbed gases issuing from the sulfuric acid scrubber with carbon tetrachloride under increased pressures, and recovering pure chlorine in the gaseous state by partial pressure release of the carbon tetrachloride solution.

2. A process for converting hydrochloric acid into chlorine comprised of the following steps: passing an aqueous hydrochloric acid solution of concentration not to exceed 35% in countercurrent flow with a gaseous mixture of oxygen and $NO_2$ at temperatures between 80° C. and the boiling point of said hydrochloric acid solution through a reactor provided with packing material, scrubbing the effluent gases from said reactor with sulfuric acid having a concentration of 60%–98% to absorb $NO_2$ and moisture from the said effluent gases, further scrubbing the unabsorbed gases issuing from the sulfuric acid scrubber with carbon tetrachloride under increased pressures, and recovering pure chlorine in the gaseous state by partial pressure release of the carbon tetrachloride solution.

3. A process for converting hydrochloric acid into chlorine comprised of the following steps: passing an aqueous hydrochloric acid solution of concentration not to exceed 35% in countercurrent flow with a gaseous mixture of oxygen and $NO_2$ at temperatures between 80° C. and the boiling point of said hydrochloric acid solution through a reactor provided with packing material with increased throughput through the reactor to such a rate, that the concentration of the effluent aqueous liquid hydrochloric acid amounts to 3%–10%, whereby the latter is recycled for reloading with hydrogen chloride, scrubbing the effluent gases from said reactor with sulfuric acid having a concentration of 60%–98% to absorb $NO_2$ and moisture from the said effluent gases, further scrubbing the unabsorbed gases issuing from the sulfuric acid scrubber with carbon tetrachloride under increased pressures, and recovering pure chlorine in the gaseous state by partial pressure release of the carbon tetrachloride solution.

References Cited in the file of this patent

UNITED STATES PATENTS

| | | |
|---|---|---|
| 1,310,943 | Datta | July 22, 1919 |
| 2,092,383 | Tramm et al. | Sept. 7, 1937 |
| 2,393,229 | Bouchard | Jan. 22, 1946 |
| 2,656,011 | Frey | Oct. 20, 1953 |
| 2,665,195 | Congdon | Jan. 5, 1954 |

OTHER REFERENCES

J. W. Mellor's "Inorganic and Theoretical Chemistry," vol. 8, 1928 Ed., page 618. Longmans, Green & Co., N. Y.

Roscoe & Schorlemmer, vol. 1, "Treatise on Chem.," 1905, pages 194, 202–204, MacMillan & Co., Ltd., N. Y.